Sept. 4, 1951 C. C. JACKSON ET AL 2,567,153
WINDOW STRUCTURE
Filed Aug. 25, 1949 2 Sheets-Sheet 2
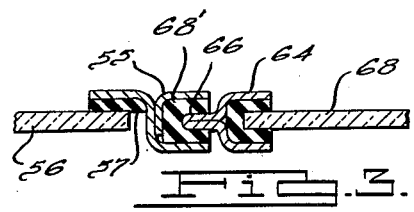
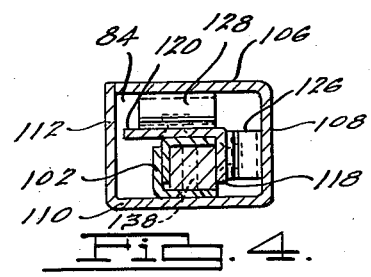
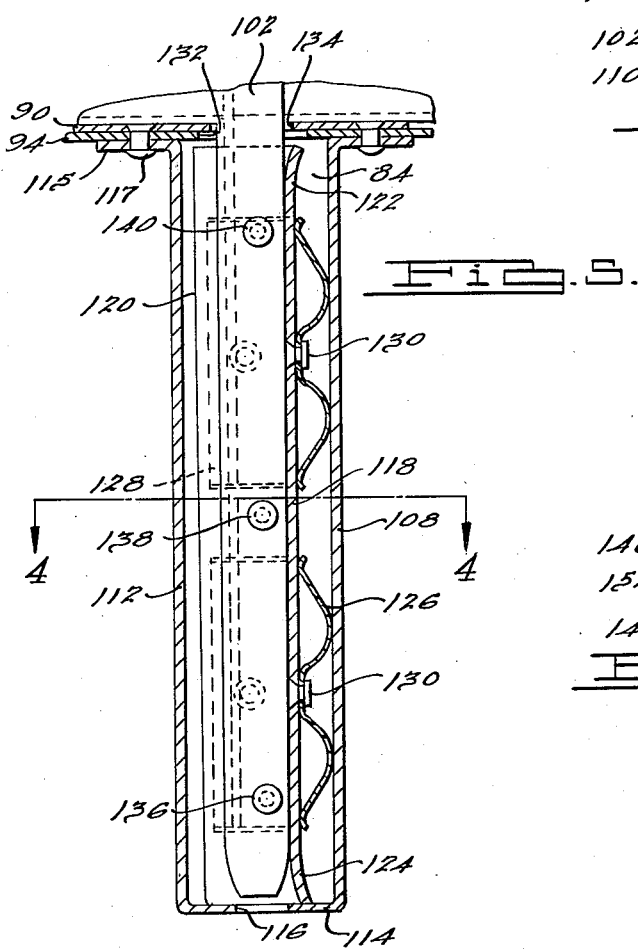
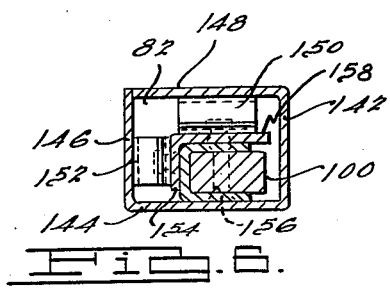
INVENTORS.
Clifford C. Jackson
Herman W. Smith.
BY
Harness and Harris
ATTORNEYS.

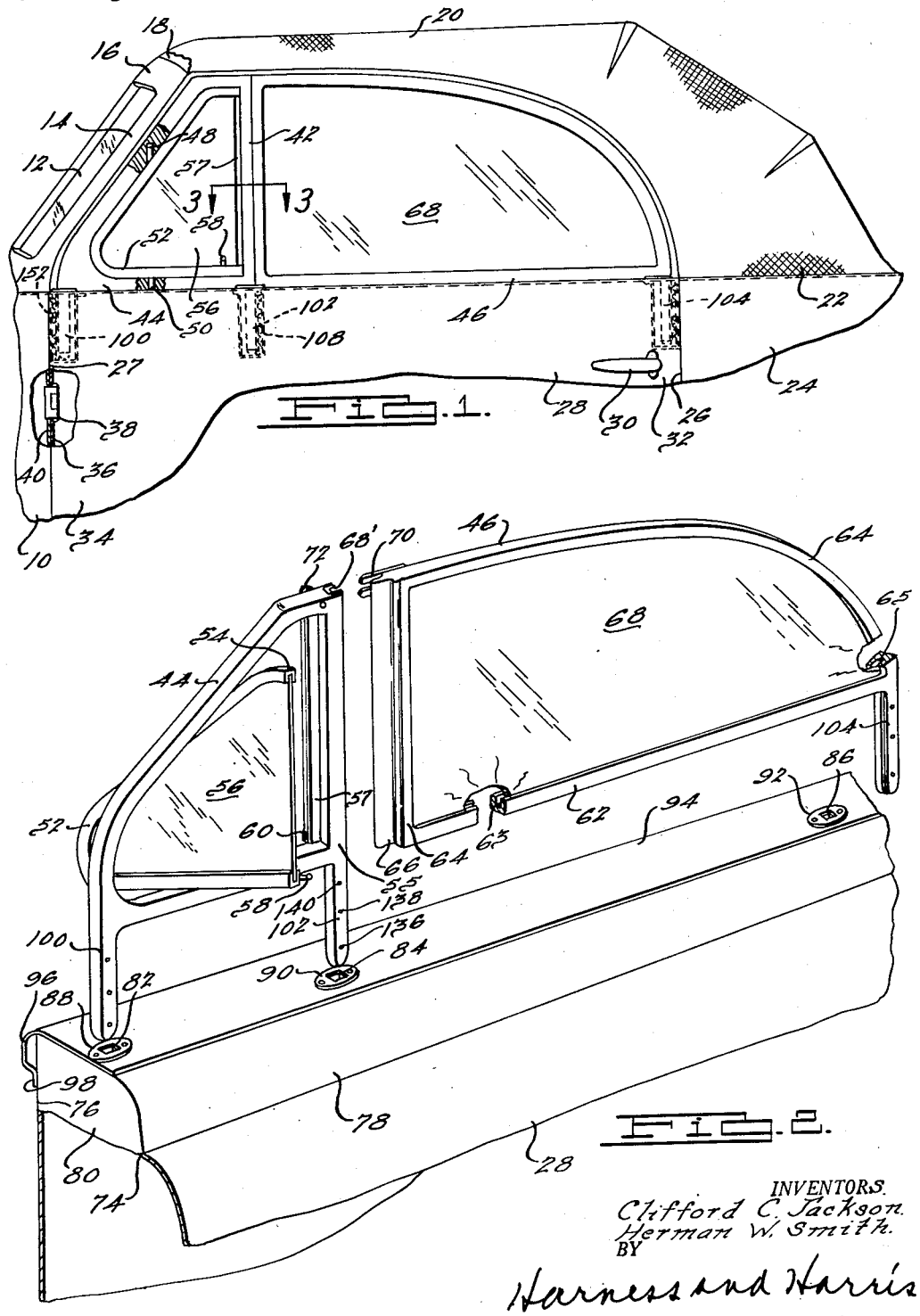

Patented Sept. 4, 1951

2,567,153

UNITED STATES PATENT OFFICE 2,567,153

WINDOW STRUCTURE

Clifford C. Jackson, Detroit, and Herman W. Smith, Highland Park, Mich., assignors to Chrysler Corporation, Highland Park, Mich., a corporation of Delaware Application August 25, 1949, Serial No. 112,282

10 Claims. (Cl. 296—44)

This invention relates to removable window structure and more particularly to window structure such as applies to doors for automotive or other vehicle bodies. By other vehicles is meant a railway car, boat, aeroplane or the like, although the design and arrangement of the instant window panels finds special utility in connection with automobile and bus bodies.

According to a feature of the invention the window panels provided may be used to effect closure of either of the complementary sides of a window opening selectively or both openings when desired.

According to another feature of the invention, one or both of the frames for the complemental window panel may be readily removed from the window opening when the presence of the appropriate glass panel is no longer desired and then stored away until needed.

According to a further feature, need for any hand crank and panel adjusting or regulating mechanism is effectively eliminated. Hence the entire door assembly upon which the instant window structure may be mounted can be of relatively cheap construction and desirable economies in manufacture may thus be realized. Moreover, but few parts are required and in service the simplified design leads to little attention being required to maintain the structure in suitably adjusted condition.

The invention possesses other advantageous features, some of which with the foregoing will be set forth at length in the following description, where will in full be outlined that preferred form of the invention selected for illustration in the drawings. The preferred embodiment of the improved window structure as shown in the drawings, however, is not to be considered a limitation in form since the invention may be embodied in a plurality of forms having such modifications and equivalent structure as will readily occur to those skilled in the art but which are still within the scope of the invention.

In the drawings:

Figure 1 is a side elevational view of vehicle structure to which the invention has been applied;

Figure 2 is an exploded view in perspective of the window structure of Figure 1;

Figure 3 is a section through the mullion of Figure 1;

Figure 4 is a section through the stake below the mullion in Figure 1;

Figure 5 is a longitudinal view of the stake of Figure 4; and

Figure 6 is a section through the stake adjacent the door hinge in Figure 1.

Specifically in Figure 1 there appears a vehicle of the roadster type having a body 10 provided with a windshield 12. Laterally bordering the windshield is a body pillar 14 on the top end of which is carried molding structure 16. On molding structure 16 is received a header bar 18 attached to the forward end of a collapsible top 20. The rear portion 22 of collapsible top 20 is received on the body of the roadster adjacent the rear quarter panel 24, which is formed at its forward edge with door jamb structure 26. Door jamb structure 26 together with the vehicle top 20, the body pillar 14 and the remainder of the vehicle body, such as the door jamb structure 27 define an opening in the body for access incident to occupancy therein. In the lower portion of the opening just described a door 28 is adapted to be received. The rearward portion 32 of door 28 may be provided with a handle 30 for operating the door latch mechanism, not shown. In the forward part of the door structure at 34 may be provided a hinge mounting bracket 36 provided for a hinge 38 used to swing the door relative to the vehicle body. Hinge 38 is received at a mounting bracket 40 formed in the body 10 of the vehicle. The area remaining of the body access opening is utilized for a window opening defined by the upper part of door 28, by the top 20, and by the body pillar 14. Dividing the window area into two smaller areas is a mullion 42 having a forward triangular member 44 and a rearward member 46 which reach around the said smaller areas respectively. Mounted in member 44 are pivots 48 and 50, which carry molding channel 52.

In Figures 1 and 2, especially the latter, channel molding 52, may be seen to be formed of U-shaped channel structure 54 into which is received a transparent glass-like panel 56. Panel 56 and molding 52 are adapted by means of the pivots 48 and 50 just described to be adjustable within the triangular framework 44. Upon the upright member 55 of framework 44 is formed an abutment 57 against which the swinging panel 56 may abut when in closed position. At such time the slidable bolt 58 carried by molding channel 52 may be slid into engagement with a striker plate 60 formed on the abutment 57 and the swinging window panel locked in place. The rear window panel 68 is adapted to be received in the framework 46 so as to rest along the lower substantially horizontal edge 62 thereof. Framework 46 is also provided with an upright member 64 at its forward end on which is formed a tongue member 66. The top portion of framework 46 is curved downwardly at the rear 64 thereof to blend into the lower edge member 62. As will be observed in the broken out sections of Figure 2, the channel molding surrounding glass-like panel 68 is provided with a U-shaped groove or channel as at 63 and 65 for positively holding each edge of the panel 68 and preventing any movement of the panel relative to framework 46. Tongue 66 on the forward upright end of framework 46 is adapted to be received in a groove member formed in the upright 55 of triangular framework 44. The groove member presents groove structure 68' adapted to receive the tongue 66 of framework 46. The open upper end of upright 55 will be noted also to have configuration, by virtue of channel-shaped structure 68', suitable for receiving tongue 66 from the upper side thereof. Suitable fastening means as at 70 and 72 may be provided for holding together against relative movement the two frameworks at their tops once the tongue and groove members 66, 68' have been mated.

In Figure 2 the door construction 28 of the vehicle will be seen to comprise a substantial, vertically disposed structural shell section 74. The shell section 74 comprises inner and outer walls 76 and 78 and an end wall 80. The shell section of the door is provided at the top thereof with cavities 82, 84, and 86 which are respectively bordered at the openings of the cavities with suitable escutcheon plates 88, 90, and 94. Overlying the outer wall 78 of the door and closing off the top of the structural shell section between the cavities just described may be provided a garnish molding 94 which is formed on the inside of the door at 96 to provide a roll which terminates in a depending flange 98.

Garnish molding 94 provides more or less a solid ledge for the support of the window structure and swings rigid with the door about hinge 38 in the opening of the vehicle body. Depending stakes 100 and 102 are attached to triangular framework 44 for reception in the respective cavities 82 and 84 in the door. An additional depending stake 104 is provided at the rear end of the non-adjustable framework 46 for reception in cavity 86 formed in door 28.

According to the sectional showing of mullion 42 in Figure 3, the fixed window panel 68 is shown received in the channel-providing molding of the upright member 64 in framework 46. Inasmuch as the channels of the molding around glass 68 all face medially, the glass is restrained against any movement relative to framework 46. The tongue structure 66 formed on upright 64 is adapted to slide in the grooved structure 68' of upright 55 on the triangular framework. Tongue 66 may be slid longitudinally along the groove providing structure 68' and removed therefrom by retracting it through the open upper end of structure 68.

In Figures 4 and 5 there appear respectively, section and longitudinal views of the stake 102 on the triangular framework as received in the cavity 84 of the vehicle door. The internal walls of the door cavity are comprised by members 106, 108, 110, and 112. These walls, which extend longitudinally, are terminated at their bottom ends by a transverse wall 114 in which an opening 116 may be provided. At the upper end of longitudinal walls 106, 108, 110, and 112 is formed a flange 115, which is attached to garnish molding 94 and the escutcheon plate 90 by means of a rivet 117. Confined within the chamber or cavity just described is an L-shaped member having legs 118 and 120. The L-shaped member is prevented from longitudinal movement in the cavity owing to the garnish molding 94 at the top and the bottom wall 114. At the upper end of the L-shaped member is a flared portion 122 and at the lower end another flared portion 124. The leg 120 of the L-shaped member carries a spring 128 tending to urge separation thereof from wall 106. Leg 118 of the L-shaped member carries as by suitable rivets 130 a similar spring structure 126. Spring members 128 and 126 cooperate to urge the L-shaped member respectively from the walls 106 and 108. Apertures 134 and 132 formed respectively in escutcheon plate 90 and garnish molding 94 provide access to the chamber from above for stake 102. The stake 102, which may be fabricated of structural elements to the number desired and riveted together as by a rivet at 138, is adapted to be received resiliently in the door cavity by coming into contact with the flared portion 122 of the L-shaped member and resiliently held after insertion thereinto against movement by the resilient springs 128 and 126.

In Figure 6 is shown a sectional view of a cavity 82 designed to receive stake 100 depending from the forward end of the triangular framework. Stake 100 is adapted as to its structural component to be held together by a rivet such as 156. Stake 100 is slidably received by an L-shaped structure comprising legs 154 and 158, both legs of which are suitably spaced from walls 144 and 142 of the cavity. Resilient spring members 150 and 152 are carried by the legs of the L-shaped member and are resiliently urged away from the walls 148 and 146.

In operation, the device of Figures 1 through 6 may be assembled in steps as follows. Into the door and from above the ledge formed by garnish molding 94 the triangular framework 44 may be mounted by registering the stakes 100 and 102 with their respective cavities 82 and 84 and pressing the framework to rest upon the garnish molding 94. The framework will be seen to find its sole support on the resulting ledge and to be resiliently held thereon by virtue of the action of the springs just described. It is to be noted that springs 128 and 150 of Figures 4 and 6 respectively tend to urge the stakes and the framework toward the outer wall of the door. The opposed springs 108 and 152 at the same time tend to urge stakes 100 and 102 in a direction toward one another. The fixed window panel 68, dependent for its support on the triangular frame 44, may then be installed as desired. The installation amounts simply to inserting the lower part of tongue 66 of framework 46 in the upper open end of the channel member 68 formed on the upright 55 of the triangular frame. Simultaneously the stake 104 at the rear end of frame 46 is brought into registry with cavity 86 formed in the vehicle door 28. Then the fixed panel 68 and frame 46 may be slid downwardly into position on the ledge furnished by door 28 so as to find support thereupon as shown in Figure 1. The resulting fixed detachable frame 46 may be latched in place at the top thereof by means of the cooperating latch members 70, 72. The user of this window structure then has the option of opening the swinging panel 56 such that only the rear half of the window opening is closed by panel 68, of closing the swinging panel 56 such that the entire portion of the window opening is closed, or of removing the detachably fixed framework 46 altogether from the door and using the triangular framework 44 merely in its capacity of supporting the swinging panel 56 into some adjusted or closed position.

The swinging panel will be observed in Figure 1 to be pivoted about the axis passing through pivots 48 and 50. A substantial portion of the area lies to either side of the swing axis although the relatively major port thereof lies to the rearward of the axis and the minor part, of a smaller triangular configuration, lies forward of the axis. Provision may be made in the vehicle body to store either or both of the window frames when not in use.

The window structure of the present invention has been shown as applied to a vehicle of the so-called roadster type. However, within the broader aspects of the invention this window structure may be applied to cabriolets and even coupes and sedans of the so-called closed body construction. In the claims reference is made to a closed body wall structure. This terminology then will be understood as applying both to convertible and to the closed type vehicle just set forth. As particularly applies within the broader aspects of the invention to sedans having four doors, the instant window structure may be conceived of as being provided both for the front and the rear doors with the obvious reversal of features of having the swinging window panel to the rear of the fixed window panel in the rear door such that the swinging window panel and its framework cooperate with the body pillar in the rear quarter of the vehicle.

What is claimed is:

1. In a vehicle body characterized by structure defining an opening for access incident to occupancy divisible into predetermined upper and lower parts, said structure comprising a peg-receiving door substantially coextensive in dimensions with said lower part and swingably mounted on the body such that in closing it is confined to disposition solely in the lower part of said opening: the combination with mullion-forming elements for forming a mullion adapted to divide the said upper part of the opening into first and second areas, said mullion forming elements being incorporated in a first frame-like member fitting within the first area and a second frame-like member fitting within the second area, the frame-like members having pegs in the base thereof receivable in the peg-receiving door and adapting them to find their sole support along one edge of the door, of means slidably interlocking the two members to form the mullion.

2. In a vehicle body characterized by structure defining an opening for access incident to occupancy divisible into predetermined upper and lower parts, said structure comprising a peg-receiving door substantially coextensive in dimensions with said lower part and swingably mounted on the body such that in closing it is confined to disposition solely in the lower part of said opening: the combination with mullion-forming elements for forming a mullion adapted to divide the said upper part of the opening into first and second areas, said mullion forming elements being incorporated in a first frame-like member fitting within the first area and a second frame-like member fitting within the second area, the frame-like members having pegs in the base thereof receivable in the peg-receiving door and adapting them to find their sole support along one edge of the door, of means slidably interlocking the two members to form the mullion, and structure including adjustable and non-adjustable glass-like panels relative to said mullion mounted in said members.

3. In a vehicle body characterized by structure defining an opening for access incident to occupancy divisible into predetermined upper and lower parts, said structure comprising a peg-receiving door substantially coextensive in dimensions with said lower part and swingably mounted on the body such that in closing it is confined to disposition solely in the lower part of said opening: the combination with mullion-forming elements for forming a mullion adapted to divide the said upper part of the opening into first and second areas, said mullion forming elements being incorporated in a first frame-like member fitting within the first area and a second frame-like member fitting within the second area, the members having pegs in the base thereof receivable in the peg-receiving door and adapting them to find their sole support along one edge of the door, of means slidably interlocking the two members to form the mullion and structure including adjustable and non-adjustable glass-like panels relative to said mullion mounted in said members with the mounting of the first member being provided with medially opening channel sections for receiving at least a portion of every opposed edge of said non-adjustable panel for precluding any relative movement thereto.

4. In a vehicle body characterized by structure defining an opening for access incident to occupancy divisible into predetermined upper and lower parts, said structure comprising a peg-receiving door substantially coextensive in dimensions with said lower part and swingably mounted on the body such that in closing it is confined to disposition solely in the lower part of said opening: the combination with mullion-forming elements for forming a mullion adapted to divide the said upper part of the opening into first and second areas, said mullion forming elements being incorporated in a first frame-like member fitting within the first area and a second frame-like member fitting within the second area, the frame-like members having pegs in the base thereof receivable in the peg-receiving door and adapting them to find their sole support along one edge of the door, of means slidably interlocking the two members to form the mullion and structure including adjustable and non-adjustable glass-like panels relative to said mullion mounted in said members, an adjustable panel of said glass-like panels having pivots associated therewith supporting said panel to swing relative to and on said second member such that a major area of the panel lies on one side of the pivotal axis and a minor area lies on the other side thereof.

5. Body construction including a supporting member, a door swingably mounted thereon including a substantially vertically disposed structural shell section having garnish molding means formed with cavities spaced along the upper edge of the shell section and forming a wall closing off the shell section between the spaced cavities along its said upper edge, and in combination therewith, adjustable window structure adapted to find its sole support upon said garnish molding means comprising a generally triangular framework, a transparent panel conforming generally to said framework, and pivot means swingably supporting said panel on certain adjacent sides of the triangular framework whereby a relatively substantial area of the transparent panel is disposed on either side of the pivotal axis, and fixed type window structure having a substantially upright edge and a lower edge extending from the base thereof comprising a framework, a transparent panel conforming generally to the framework and firmly engaged against movement of separation away from said edges, said lower edge being adapted for support upon the garnish molding means of said door, said upright edge and adjustable window structure having means associated therewith for slidably effecting mutual engagement between the frameworks.

6. Body construction including a supporting member, a door swingably mounted thereon including a substantially vertically disposed structural shell section having garnish molding means formed with cavities spaced along the upper edge of the shell section and forming a wall closing off the shell section between the spaced cavities along its said upper edge, and in combination therewith, adjustable window structure adapted to find its sole support upon said garnish molding means comprising a generally triangular framework, a transparent panel conforming generally to said framework, and pivot means swingably supporting said panel on certain adjacent sides of the triangular framework whereby a relatively substantial area of the transparent panel is disposed on either side of the pivotal axis, fixed type window structure having a substantially upright edge and a lower edge extending from the base thereof comprising a framework, a transparent panel conforming generally to the framework and firmly engaged against movement of separation away from said edges, said lower edge being adapted for support upon said garnish molding means of said door, said upright edge and adjustable window structure having means associated therewith for slidably effecting mutual engagement between the frameworks, and elements depending at spaced intervals from said window structures for reception in said cavities and adapting said door to provide stabilized support therefor.

7. In a vehicle body, the combination with a closed-body wall structure including a relatively sharply inclined body pillar and a side door contributing respectively to define certain adjacent sides of a window opening, a panel located in the window opening in the vicinity of said adjacent sides and a pivot carrying the panel for swinging movement, and means rigid with the door providing a ledge along the door side of the opening restricting access to the interior of the door, of supporting structure detachably supporting said panel carrying pivot securely along a portion of said ledge means, said supporting structure being provided with means forming an upwardly open substantially upright guide thereon, another panel incapable of opening located in the window opening so as to complement the pivoted panel, structure permanently engaging the periphery of said other panel and having an edge along the bottom dimension thereof, said edge being received on the balance of said ledge means, means detachably engaging one end of the engaging structure with said side door, and means on the other end of the engaging structure slidably introduceable in said guide means through the upwardly open end thereof for effecting disengageable engagement between the panel structures whereby the pivoted panel has operative utility with or without the complemental panel structure.

8. In a vehicle body, the combination with a closed-body wall structure including a relatively sharply inclined windshield pillar for the body and a side door immediately therebehind contributing respectively to define certain adjacent sides of a window opening, a panel located in the window opening in the vicinity of said adjacent sides, and means rigid with the door providing a ledge along the door side of the opening restricting downward access to the interior of the door, of structure detachably supporting said panel securely along a portion of said ledge means in a manner to allow disengaged bodily separation therebetween, complemental panel structure received on the balance of said ledge means, means for disengageably securing together said structures and for aligning them on the door including a guide member and a companion member slidable therealong, one of said members being mounted on said complemental panel structure and the other being mounted on the first named panel structure.

9. In a vehicle body, the combination with a closed-body wall structure including a relatively sharply inclined windshield pillar for the body and a side door immediately therebehind contributing respectively to define certain adjacent sides of a window opening, a panel located in the window opening in the vicinity of said adjacent sides, and means rigid with the door providing a ledge along the door side of the opening restricting downward access to the interior of the door, of structure detachably supporting said panel securely along a portion of said ledge means in a manner to allow disengaged bodily separation therebetween, complemental panel structure received on the balance of said ledge means, means for disengageably effecting securement of the complemental panel structure on the door including a guide member and a companion member slidable therealong, one of said members being mounted on said complemental panel structure and the other being mounted on the first named panel structure and disposed in substantially an upright position, said other member having an unobstructed upper end adapted to provide for the introduction and entrance therein of said one member.

10. For use in a window opening characterized by a lower ledge member pivoted to swing out of the plane of the opening, in combination, a two-panel closure for said opening comprising a first glass-like panel, a frame for supporting the first panel in the opening on the lower ledge member, a second glass-like panel, a frame for supporting the second panel in the opening on the lower ledge member for completing the closure of the opening, each frame having an end adjacent the other frame and the other end remote from the other frame, stake means on said other end of each frame adapted to cooperate with the lower ledge member in detachably securing said other ends thereto, means on said adjacent ends of the frames providing for the engaged alignment thereof in the plane of said opening and including elements permitting transverse sliding motion of the frames relative one to the other in said plane, and stake means carried on a certain adjacent end of the frames adapted to cooperate with the lower ledge member in detachably securing a certain frame thereto for rendering it independently secure, the associated frame being as incident thereto afforded dependent securement thereupon.

CLIFFORD C. JACKSON.
HERMAN W. SMITH.

REFERENCES CITED

The following references are of record in the file of this patent:

UNITED STATES PATENTS

| Number | Name | Date |
|---|---|---|
| 1,288,139 | Nixon | Dec. 17, 1918 |
| 1,383,027 | Robertson | June 28, 1921 |
| 1,596,995 | Pollard | Aug. 24, 1926 |
| 1,720,953 | Geyer | July 16, 1929 |
| 1,757,860 | Hall et al. | May 6, 1930 |
| 1,981,752 | Patton | Nov. 20, 1934 |
| 2,361,609 | Doty | Oct. 31, 1944 |
| 2,448,054 | Seckel | Aug. 31, 1948 |